United States Patent
Tafazoli Bilandi et al.

(10) Patent No.: US 10,783,610 B2
(45) Date of Patent: Sep. 22, 2020

(54) METHOD AND APPARATUS FOR IDENTIFYING FRAGMENTED MATERIAL PORTIONS WITHIN AN IMAGE

(71) Applicant: Motion Metrics International Corp., Vanocuver (CA)

(72) Inventors: Shahram Tafazoli Bilandi, Vancouver (CA); Mahdi Ramezani, Vancouver (CA); Ian Law Bell, North Vancouver (CA); Mohammad Sameti, Coquitlam (CA); Purang Abolmaesumi, Vancouver (CA); Saman Nouranian, Vancouver (CA)

(73) Assignee: Motion Metrics International Corp., Vancouver, British Columbia (CA)

(*) Notice: Subject to any disclaimer, the term of this patent is extended or adjusted under 35 U.S.C. 154(b) by 0 days.

(21) Appl. No.: 15/752,430

(22) PCT Filed: Dec. 13, 2016

(86) PCT No.: PCT/CA2016/000317
§ 371 (c)(1),
(2) Date: Feb. 13, 2018

(87) PCT Pub. No.: WO2017/100903
PCT Pub. Date: Jun. 22, 2017

(65) Prior Publication Data
US 2019/0012768 A1 Jan. 10, 2019

Related U.S. Application Data

(60) Provisional application No. 62/267,059, filed on Dec. 14, 2015.

(51) Int. Cl.
*G06K 9/00* (2006.01)
*G06T 3/40* (2006.01)
(Continued)

(52) U.S. Cl.
CPC ............ *G06T 3/4046* (2013.01); *G06K 9/342* (2013.01); *G06K 9/4628* (2013.01);
(Continued)

(58) Field of Classification Search
CPC .......... G06T 2207/20192; G06T 5/004; H04N 1/4092; H04N 1/58
See application file for complete search history.

(56) References Cited

U.S. PATENT DOCUMENTS

| | | | | |
|---|---|---|---|---|
| 4,519,041 A | * | 5/1985 | Fant ....................... | G01N 21/89 382/108 |
| 5,830,141 A | * | 11/1998 | Makram-Ebeid ..... | G06T 7/0012 600/407 |

(Continued)

OTHER PUBLICATIONS

Achanta, Radhakrishna, et al. Slic superpixels. No. REP_WORK. 2010. (Year: 2010).*

(Continued)

*Primary Examiner* — Avinash Yentrapati

(57) ABSTRACT

A method and apparatus for processing an image of fragmented material to identify fragmented material portions within the image is disclosed. The method involves receiving pixel data associated with an input plurality of pixels representing the image of the fragmented material. The method also involves processing the pixel data using a convolutional neural network, the convolutional neural network having a plurality of layers and producing a pixel classification output indicating whether pixels in the input plurality of pixels are located at one of an edge of a fragmented material portion, inwardly from the edge, and at interstices between fragmented material portions. The convolutional neural network includes at least one convolution layer configured to produce a convolution of the input plurality of pixels, the convolutional neural network having been previously trained using a plurality of training images (Continued)

including previously identified fragmented material portions. The method further involves processing the pixel classification output to associate identified edges with fragmented material portions.

28 Claims, 10 Drawing Sheets

(51) Int. Cl.
    *G06N 3/04*     (2006.01)
    *G06K 9/46*     (2006.01)
    *G06K 9/34*     (2006.01)
    *G06K 9/62*     (2006.01)
    *G06T 7/50*     (2017.01)
    *G06T 7/13*     (2017.01)
    *G06N 3/08*     (2006.01)
    *G06T 1/20*     (2006.01)
    *G06T 1/60*     (2006.01)

(52) U.S. Cl.
    CPC ......... *G06K 9/6215* (2013.01); *G06K 9/6274* (2013.01); *G06N 3/0454* (2013.01); *G06N 3/08* (2013.01); *G06T 1/20* (2013.01); *G06T 1/60* (2013.01); *G06T 3/4053* (2013.01); *G06T 7/13* (2017.01); *G06T 7/50* (2017.01); *G06T 2210/22* (2013.01)

(56) References Cited

U.S. PATENT DOCUMENTS

| | | | | |
|---|---|---|---|---|
| 6,549,646 B1* | 4/2003 | Yeh | | G06K 9/6814 |
| | | | | 382/132 |
| 6,760,468 B1* | 7/2004 | Yeh | | G06T 7/0012 |
| | | | | 382/132 |
| 7,231,086 B2* | 6/2007 | Abousleman | | G06K 9/3233 |
| | | | | 382/199 |
| 8,467,599 B2* | 6/2013 | El Dokor | | G06K 9/00221 |
| | | | | 382/159 |
| 10,275,667 B1* | 4/2019 | Kim | | G06K 9/00798 |
| 10,521,902 B2* | 12/2019 | Avendi | | G06K 9/4628 |
| 2001/0002310 A1* | 5/2001 | Chishti | | A61C 7/08 |
| | | | | 433/24 |
| 2003/0210818 A1* | 11/2003 | Abousleman | | G06K 9/3233 |
| | | | | 382/199 |
| 2004/0005089 A1* | 1/2004 | Robles | | G03F 1/36 |
| | | | | 382/141 |
| 2006/0257006 A1* | 11/2006 | Bredno | | A61B 6/481 |
| | | | | 382/128 |
| 2007/0058856 A1* | 3/2007 | Boregowda | | G06K 9/3258 |
| | | | | 382/159 |
| 2007/0122036 A1* | 5/2007 | Kaneda | | G06K 9/00315 |
| | | | | 382/190 |
| 2010/0329542 A1* | 12/2010 | Ramalingam | | G06T 7/80 |
| | | | | 382/154 |
| 2011/0158536 A1* | 6/2011 | Nakano | | G06K 9/00281 |
| | | | | 382/190 |
| 2012/0163688 A1* | 6/2012 | Salazar-Tio | | G01N 23/046 |
| | | | | 382/131 |
| 2013/0243313 A1* | 9/2013 | Civit | | G06T 5/002 |
| | | | | 382/164 |
| 2014/0072208 A1* | 3/2014 | Kenyon | | G06K 9/6211 |
| | | | | 382/159 |
| 2014/0362248 A1* | 12/2014 | Ishida | | H04N 5/23293 |
| | | | | 348/222.1 |
| 2015/0078653 A1* | 3/2015 | Tafazoli Bilandi | | |
| | | | | G06K 9/00201 |
| | | | | 382/154 |
| 2015/0278642 A1* | 10/2015 | Chertok | | G06K 7/1482 |
| | | | | 382/156 |
| 2015/0347859 A1* | 12/2015 | Dixon | | G06K 9/186 |
| | | | | 382/138 |
| 2016/0180541 A1* | 6/2016 | Romanenko | | G06K 9/0051 |
| | | | | 382/103 |
| 2017/0017841 A1* | 1/2017 | Chen | | G06T 7/12 |
| 2017/0032285 A1* | 2/2017 | Sharma | | G06N 3/0454 |
| 2017/0076448 A1* | 3/2017 | Chen | | G06K 9/00147 |
| 2017/0140236 A1* | 5/2017 | Price | | G06K 9/3241 |
| 2017/0147888 A1* | 5/2017 | Zeng | | G06K 9/6273 |
| 2018/0108138 A1* | 4/2018 | Kluckner | | G06T 7/13 |
| 2018/0293722 A1* | 10/2018 | Crocco | | G06F 11/079 |

OTHER PUBLICATIONS

Ning, Feng, et al. "Toward automatic phenotyping of developing embryos from videos." IEEE Transactions on Image Processing 14.9 (2005): 1360-1371. (Year: 2005).*

Palaz, Dimitri, Ronan Collobert, and Mathew Magimai Doss. "Estimating phoneme class conditional probabilities from raw speech signal using convolutional neural networks." arXiv preprint arXiv:1304.1018 (2013). (Year: 2013).*

Hwang, Jyh-Jing, and Tyng-Luh Liu. "Contour detection using cost-sensitive convolutional neural networks." arXiv preprint arXiv: 1412.6857 (2014). (Year: 2014).*

International Search Report issued by the Canadian Intellectual Property Office in connection with International Patent Application No. PCT/CA2016/000317, dated Feb. 23, 2017, 3 pages.

Written Opinion of the International Searching Authority issued by the Canadian Intellectual Property Office in connection with International Patent Application No. PCT/CA2016/000317, dated Feb. 22, 2017, 5 pages.

Browne et al., "Convolutional neural networks for image processing: an application in robot vision", the 16th Australian Joint Conference on Artificial Intelligence—AI'03, Dec. 2003, Perth Australia.

Kazem Oraee et al. "Prediction of Rock Fragmentation in Open Pit Mines, using Neural Network Analysis" Proceeding of the fifthteenth International Symposium on Mine Planning and Equipment Selection (MPES Sep. 20-22, 2006, Turin Italy.

Matthew J. Thurley et al. "An industrial 3D vision system for size measurement of iron ore green pellets using morphological image segmentation" Lulea University of Technology, Dept of Computer Science and Electrical Enginering, Lulea SE-97187, accepted Oct. 30, 2007.

B. Sameti et al. "A Portable Device for Mine Face Rock Fragmentation Analysis" SME Annual Meeting Feb. 23-26, 2014, Salt Lake City, UT.

Achanta et al., "SLIC Superpixels" No. RE_WORK, 2010. Published Jul. 29, 2010 as per Internet Archive [retrieved Nov. 18, 2019, published Jul. 29, 2010 as per Internet Archive] https://web.archive.org/web/20100729133055/http://infoscience.epfl.ch/record/149300.

Al Shack—"Convolutions: Image convolution examples". [retrieved from the internet on Nov. 18, 2019]. Published Oct. 28, 2014 as per Internet Archive. https://web.archive.org/web/20141028174353/http://aishack.in/tutorials/image-convolution-example.

Wikipedia. https://en.wikipedia.org/wiki/Kernel_(image_processing). Definition of : Kernel (image processing).

Noy. "The latest in on-line fragmentation measurement—stereo imaging over a conveyor". conference: Proceedings for the 8th International Symposium on Rock Fragmentation by Blasting, At Santiago, Chile. May 2006.

Yugang Liu and Yizhou Yu. "Interactive Image Segmentation Based on Level Sets of Probabilities". IEEE Transactions on Visualization and Computer Graphics, vol. 18, No. 2 February pp. 202-213.

Leo Grady, "Random Walks for Image Segmentation" IEEE Transactions on Pattern Analysis and Machine Intelligence, vol. 28, No. 11, Nov. 2006. pp. 1-17.

D'Addona et al., "Image data processing via neural networks for tool wear prediction", 8th CIRP Conference on Intelligent Computation in Manufacturing Engineering, 2013, vol. 12, p. 252-257.

* cited by examiner

METHOD AND APPARATUS FOR IDENTIFYING FRAGMENTED MATERIAL PORTIONS WITHIN AN IMAGE

BACKGROUND

1. Field

This invention relates generally to image processing and more particularly to processing an image to identify fragmented material portions within the image.

2. Description of Related Art

Image processing techniques may be used for identification of fragmented material portions within an image of a fragmented material. An image or images are acquired of a fragmented material such as rock fragmented by blasting or other excavation processes. Various image segmentation techniques may be applied in an attempt to classify the fragmented portions. Fragmented materials are irregular by nature and thus more difficult to classify in comparison to other image classification problems where there are common features present in the subjects being classified, such as facial recognition for example.

There remains a need for improved methods and apparatus for identifying fragmented portions in a fragmented material.

SUMMARY

In accordance with one disclosed aspect there is provided a method for processing an image of fragmented material to identify fragmented material portions within the image. The method involves receiving pixel data associated with an input plurality of pixels representing the image of the fragmented material. The method also involves processing the pixel data using a convolutional neural network, the convolutional neural network having a plurality of layers and producing a pixel classification output indicating whether pixels in the input plurality of pixels are located at one of an edge of a fragmented material portion, inwardly from the edge of a fragmented material portion, and at interstices between fragmented material portions. The convolutional neural network includes at least one convolution layer configured to produce a convolution of the input plurality of pixels, the convolutional neural network having been previously trained using a plurality of training images including previously identified fragmented material portions. The method further involves processing the pixel classification output to associate identified edges with fragmented material portions.

Producing the convolution may involve producing the convolution using a sparse kernel having entries separated by rows and columns of zero values.

Producing the convolution may involve producing the convolution using a sparse kernel having entries separated by plurality of rows and a plurality of columns of zero values.

Processing the pixel data using the convolutional neural network may involve processing the pixel data using a first convolutional neural network and using the pixel classification output as an input for a second convolutional neural network operable to produce a refined pixel classification output.

The plurality of training images include previously identified fragmented material portions, each fragmented material portion enclosed by an edge and regions of the fragmented material portion closer to the edge may be assigned lower confidence values than regions of the fragmented material portion away from the edge, the confidence values being indicative of a level confidence associated with the previously identified fragmented material portions in the training image.

Receiving the pixel data may involve receiving a plurality of pixel data sets, each pixel data set including data associated with at least one of an optical radiation intensity, a thermal radiation intensity, intensities associated with different primary colors, intensities under a plurality of different illumination conditions, intensities for each of a plurality of electromagnetic wavelength ranges, pixel depth information, and a distance between each pixel and a closest edge.

The method may involve processing at least one of the plurality of pixel data sets to produce a superpixel representation of the pixel data set, the superpixel representation grouping pluralities of pixels to represent the fragmented material portions using a reduced number of superpixels with respect to the number of pixels in the pixel data set.

Producing the convolution may involve producing a plurality of convolutions of the input plurality of pixels.

Receiving the pixel depth information may involve at least one of determining a pixel disparity associated with images produced by a stereoscopic image sensor, determining a pixel disparity associated with successive images produced by an image sensor, receiving time-of-flight data for pixels in the input plurality of pixels, determining depth information based on a deformation of a structured light pattern projected onto the fragmented material, and receiving a 3D point cloud produced by a laser sensor and processing the point cloud to determine a depth associated with pixels in the input plurality of pixels.

The method may involve pre-processing the pixel depth information prior to producing the convolution.

The method may involve using the pixel depth information to estimate a physical size of the fragmented material portions.

The method may involve determining a size distribution based on the estimated fragment size for the fragmented material portions.

The method may involve converting the fragment size distribution into a corresponding sieve analysis result.

Processing the pixel data using the convolutional neural network may further involve processing the pixel classification output in a further neural network layer to generate a size distribution output, the neural network having been previously trained using a plurality of fragmented material training images including fragment size indications for the fragmented material portions.

The convolutional neural network may include a pooling layer configured to process the convolution to provide a plurality of pooling outputs, each pooling output being based on values associated with a plurality of pixels in the convolution.

The pooling layer may implement one of a max-pooling, an average pooling, and a stochastic pooling process.

The convolutional neural network may include at least one up-sampling layer following the pooling layer, the up-sampling layer being operable to replicate outputs to produce an up-sampled pixel classification, and the method may further involve generating a cropped copy of the convolution of the input plurality of pixels, the cropped copy having a size corresponding to the size of the up-sampled pixel classification, and combining the up-sampled pixel classification with the cropped copy of the convolution to produce a pixel classification having increased spatial resolution.

Processing the pixel classification output to associate identified edges with fragmented material portions may involve applying a morphological algorithm to the pixel classification output to close edge portions surrounding fragmented material portions.

The method may involve applying a weighting to the pixel classification output, the weighting having different weights assigned to pixels classified as edges of the fragmented material portion, pixels classified as being inward from the edge of a fragmented material portion, and pixels classified as being in an interstice between fragmented material portions.

Applying the morphological algorithm to the pixel classification output may involve implementing at least one of a dilation algorithm, an erosion algorithm, a watershed algorithm, an opening algorithm, and a closing algorithm.

The method may involve identifying interstices between fragmented material portions as including one of fine fragmented material and a void.

The method may involve resampling the pixel data associated with the input plurality of pixels to produce at least one resampled input plurality of pixels and processing using the convolutional neural network may involve processing the one or more resampled input plurality of pixels, the convolutional neural network having been previously trained using a correspondingly resampled plurality of fragmented material training images including previously identified fragmented material portions.

Resampling the pixel data may involve at least one of up-sampling the pixel data and down-sampling the pixel data.

The pixel classification output may be generated by performing the convolution on patches of pixels surrounding a pixel being classified, the patch of pixels having a size selected in accordance with a scale of fragmented material surrounding the pixel being classified, the scale being determined by one of a user input, pixel depth information, based on a trained network from corresponding pixel and depth data, and based on pixel classification output using an initial selection of patch size.

In accordance with another disclosed aspect there is provided an apparatus for performing a fragmentation analysis. The apparatus includes an image sensor operable to capture an image of fragmented material including fragmented material portions and to generate pixel data associated with an input plurality of pixels representing the image. The apparatus also includes a processor circuit operably configured to process the pixel data using a convolutional neural network, the convolutional neural network having a plurality of layers and producing a pixel classification output indicating whether pixels in the input plurality of pixels are located at one of an edge of a fragmented material portion, inward from the edge of a fragmented material portion, and at an interstice between fragmented material portions. The convolutional neural network includes at least one convolution layer configured to produce a convolution of the input plurality of pixels, the convolutional neural network having been previously trained using a plurality of training images including previously identified fragmented material portions. The processor circuit is further operably configured to process the pixel classification output to associate identified edges with fragmented material portions.

The processor circuit may include a graphics processing unit (GPU) and associated graphics memory and the convolutional neural network may be implemented at least in part using GPU functions and data generated by operations associated with the convolutional neural network may be stored in the graphics memory.

The image sensor may be disposed on one of a portable fragmentation analyzer including a processor circuit operable to produce results of the fragmentation analysis, and a fragmentation imager in communication with a remotely located processor circuit operable to produce results of the fragmentation analysis.

The image sensor may be disposed to capture an image of fragmented material being conveyed by one of a ground engaging tool of heavy equipment operable to load fragmented material, a load-carrying container of a haul truck, and a conveyor belt.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Figure 1:
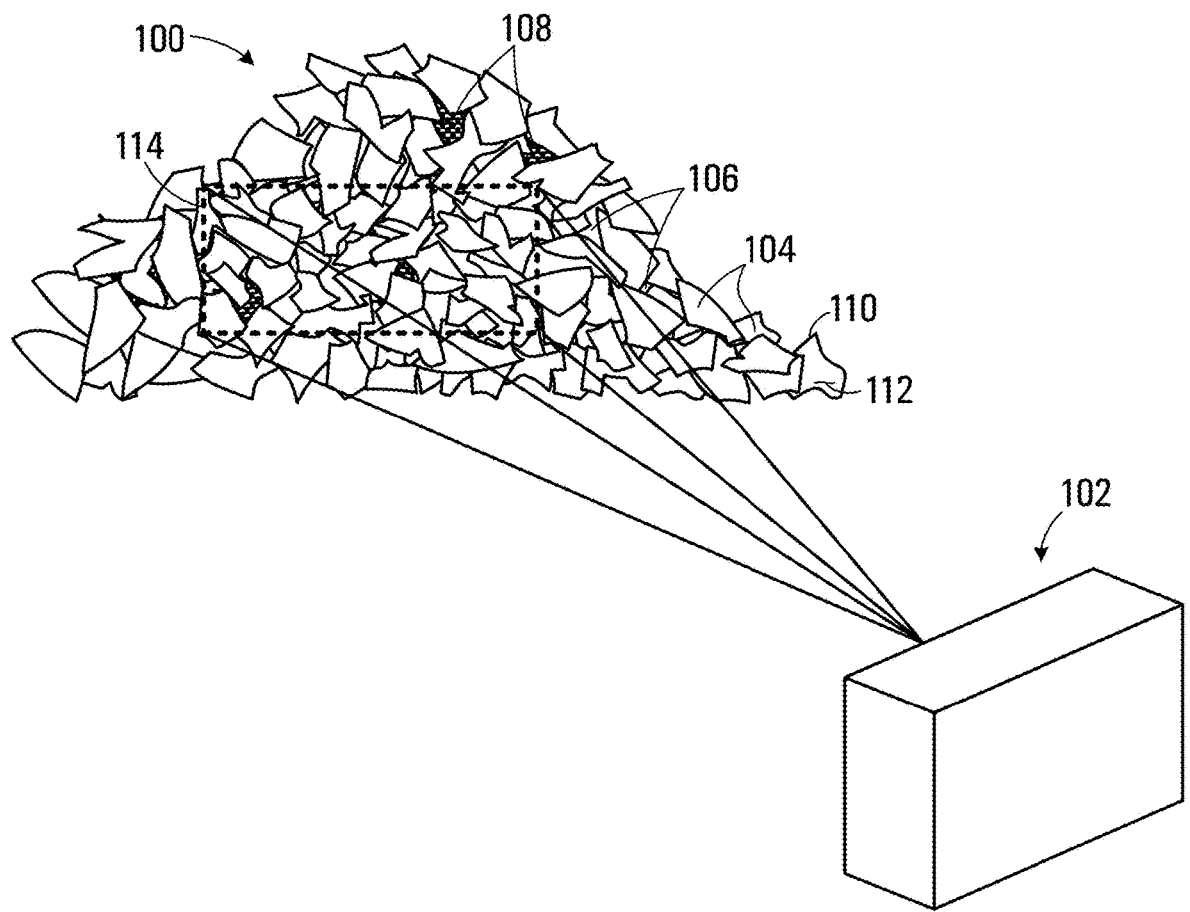
FIG. 1 is a perspective view of an image sensor apparatus for capturing an image of a fragmented material.

Referring to FIG. 1, an image sensor apparatus operable to capture an image of a fragmented material 100 is shown generally at 102. The fragmented material 100 includes fragmented material portions 104 and regions of finely fragmented material 106 and/or voids 108 in interstices between the fragmented material portions. The image sensor 102 generates pixel data associated with an input plurality of pixels representing the captured image of the fragmented material 100 within a field of view 114 of the image sensor.

Figure 2:
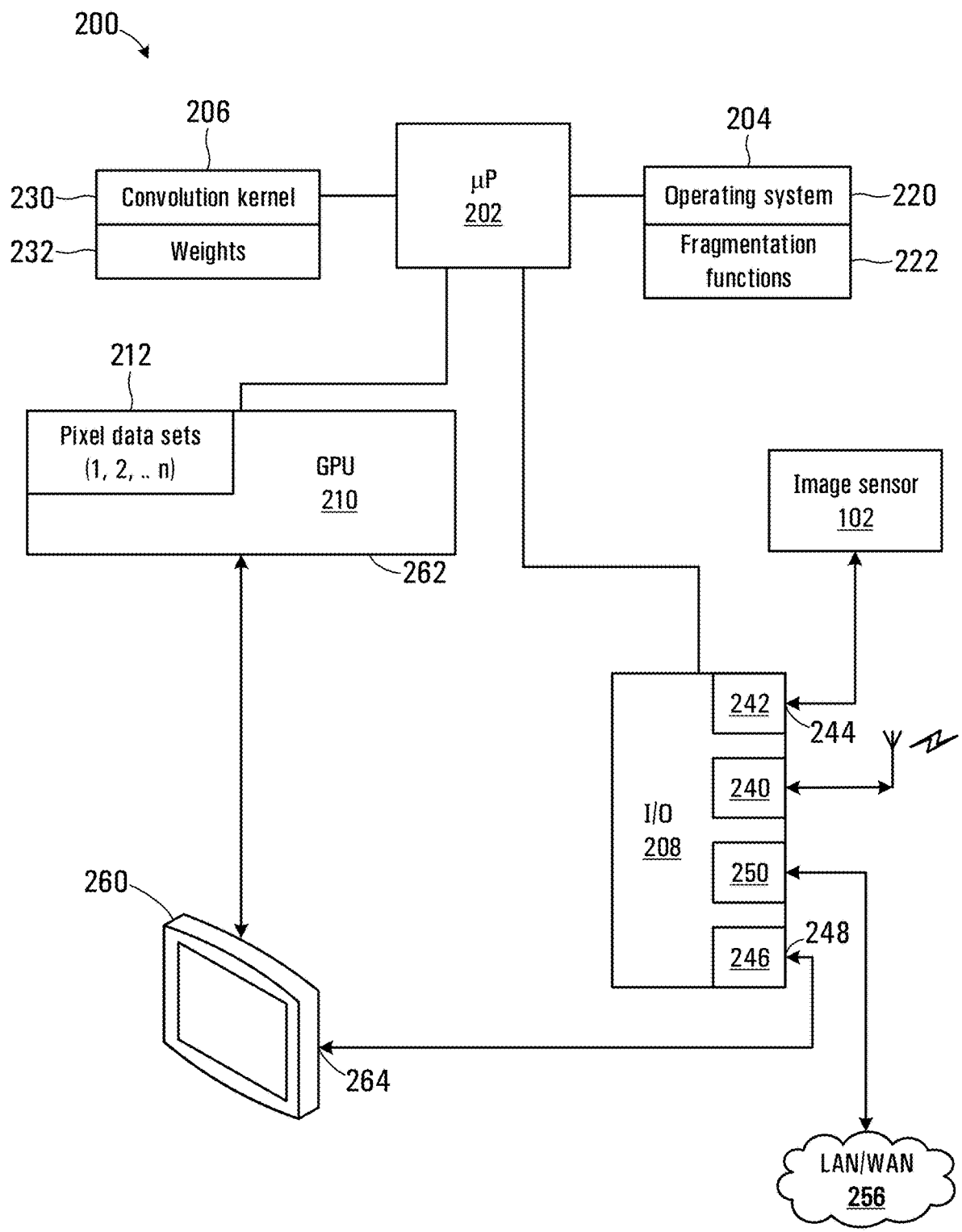
FIG. 2 is a processor circuit in accordance with one disclosed embodiment for processing image pixel data captured by the image sensor shown in FIG. 1.

Referring to FIG. 2, a processor circuit for processing the pixel data in accordance with one disclosed embodiment is shown generally at 200. The processor circuit 200 includes a microprocessor 202, a program memory 204, a variable memory 206, and an input output port (I/O) 208, all of which are in communication with the microprocessor 202. In this embodiment, the processor circuit 200 also includes a graphics processing unit (GPU) 210 having an associated pixel memory 212 for storing the pixel data. The GPU is able to efficiently store pixel data and perform image processing functions on the pixel data under instruction from the microprocessor 202.

Program codes for directing the microprocessor 202 to carry out various functions are stored in the program memory 204, which may be implemented as a random access memory (RAM), flash memory, and/or a hard disk drive (HDD), or a combination thereof. The program memory includes a first block of program codes 220 for directing the microprocessor 202 to perform operating system functions, and a block of codes 222 for performing fragmentation functions.

The variable memory 206 includes a plurality of storage locations including a storage location 230 for storing values for a convolution kernel, and a storage location 232 for storing training images. The variable memory 206 may be implemented in random access memory or flash memory, for example.

The I/O 208 includes a wireless interface 240 for communicating wirelessly via a Wi-Fi network or a cellular data network. The I/O 208 also includes an interface 242 having an input 244 for receiving pixel data from the image sensor 102. The processor circuit 200 also includes a display 260 and the GPU 210 includes an output 262 for producing display signals for driving the display. In the embodiment shown the display 260 is a touch screen display and includes a USB interface port 264 and the I/O 208 further includes a USB interface 246 having a USB port 248 for interfacing with the display 260 to receive user input via the touch screen. In the embodiment shown the I/O 208 also includes a communications interface 250 for communicating via a local area network (LAN) or wide area network (WAN), such as the internet. The communications interface 250 may be an Ethernet interface, for example.

Figure 3:
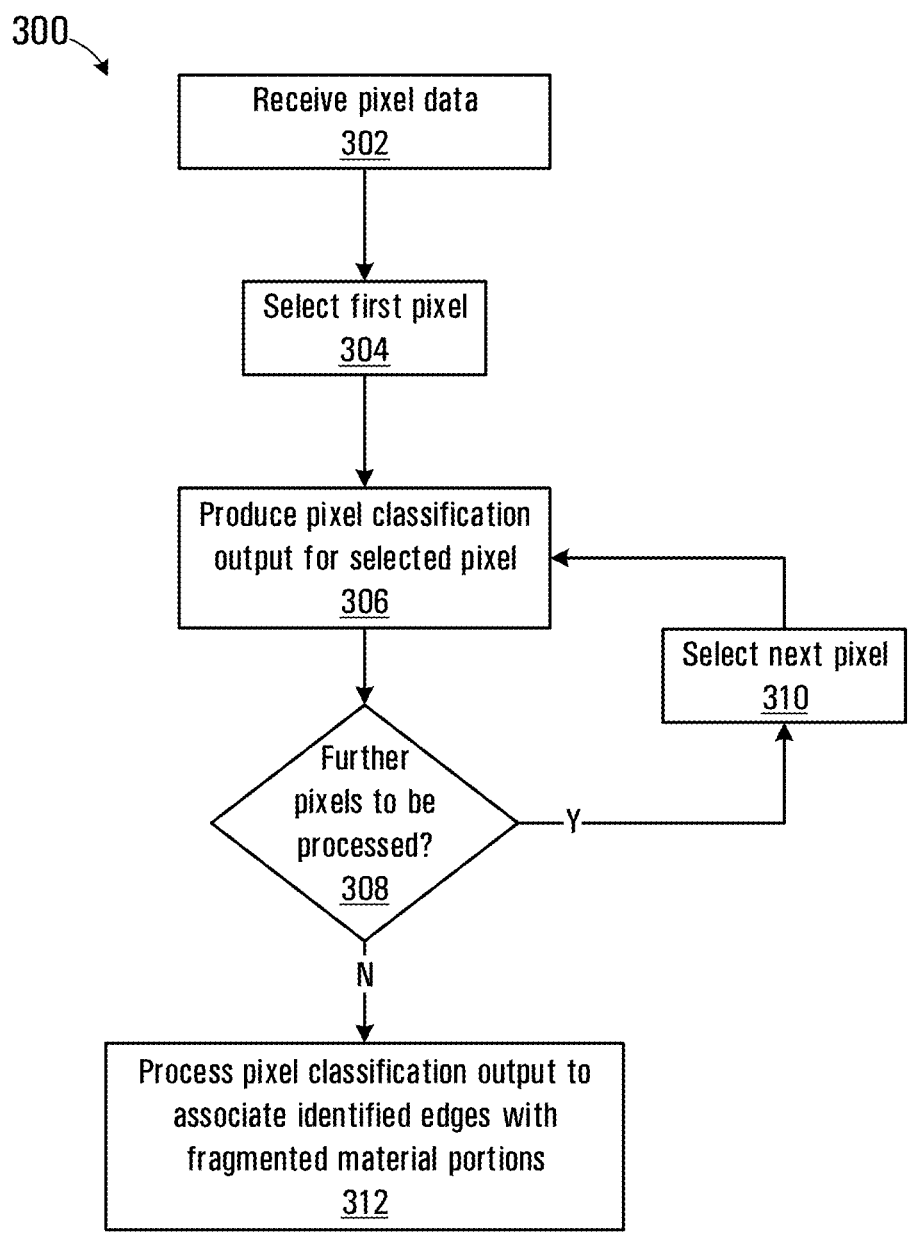
FIG. 3 is a flowchart depicting blocks of code for directing the processor circuit of FIG. 2 to identify fragmented material portions.

Referring to FIG. 3, a flowchart depicting blocks of code for directing the processor circuit 200 to identify fragmented material portions within the received pixel data is shown generally at 300. The blocks generally represent codes that may be read from the block of codes 222 in program memory 204 for directing the microprocessor 202 to perform various functions related to identifying fragmented material portions. The actual code to implement each block may be written in any suitable program language, such as C, C++, C#, Java, and/or assembly code, for example.

Block 302 directs the microprocessor 202 to receive pixel data from the image sensor 102 representing the captured image within the field of view 114 of the image sensor. In the embodiment shown in FIG. 2, the image sensor 102 is coupled to the interface 242 of the I/O 208 via a wired connection such as USB or IEEE 1394 connection for receiving the pixel data. In other embodiments the image sensor 102 may be located remote to the processor circuit 200, and the pixel data may be communicated to the processor circuit 200 via the either the wireless interface 240 or over the communications network 256 via the communications interface 250.

Block 304 directs the microprocessor 202 to select a first pixel in the plurality of pixels to process. Block 306 then directs the microprocessor 202 to produce a pixel classification output for the selected pixel. Referring back to FIG. 1, the pixel classification output indicates whether the pixel is located at an edge 110 of a fragmented material portion, inward from the edge (i.e. at a location 112 on the fragmented material portion 104), or in an interstice between fragmented material portions. Spaces between fragmented portions are generally either voids 108, or filled with finely fragmented material (fines) 106. In one embodiment the pixel classification output may be expressed in terms of a probability for each of the possible classifications, for example probability $p_e$ that the pixel is on an edge, a probability $p_f$ that the pixel is on a fragmented material portion inward from the edge, and a probability $p_i$ that the pixel is in interstitial space between fragments, where $p_e+p_f+p_i=1$.

The pixel classification output produced by the convolutional neural network may involve processing by several network layers. For example, the convolutional neural network may include a convolution layer that convolves each input pixel data with a filter or kernel. The kernel maps pixel input data for a plurality of pixels surrounding the selected pixel to produce a convolution layer output. A pooling layer may also be included to process the convolution layer output to reduce sensitivity of the output to small changes in input by condensing the amount of information in the convolution layer output. In some embodiments an additional fully connected layer may be included that connects all outputs of the pooling layer to a pixel classification output layer, that provides the pixel classification outputs $p_e$, $p_f$, and $p_i$.

Sliding windows have been used in the past to classify each pixel by providing a local region or patch around the pixel as input. However the patches of pixels have large overlap and this leads to redundant computations and a slower processing speed. The use of a convolution neural network with pooling layers and d-regularly sparse kernels eliminates many redundant computations. Increases in processing speed of up to 1500 times during training of the network may be achieved resulting in a more thorough training process. The improved training also provides a more efficient and selective training of the fragmentation network for use in the field when analyzing real fragmented materials, since the network is able to process more input information more efficiently.

The pixel classification output produced at block 306 provides a likelihood that the pixel is at an edge of a fragmented material portion, inward from the edge on the fragmented material portion, or between fragmented material portions. The layers of the convolutional neural network have a plurality of neurons, each of which perform some function on the inputs received and produce an output that is weighted by weights $w_{ij}$. The weights $w_{ij}$ are determined during a training of the neural network using a plurality of training images. The training images are generally real images of fragmented materials that have been evaluated to identify fragmented material portions. In some embodiments, the evaluation is manual in that an operator will evaluate an image and label fragmented material portions within the image. The image is then saved along with information identifying each pixel as being at an edge of a fragmented material portion, inward from the edge on the fragmented material portion, or between fragmented material portions. A plurality of training images may be assembled to make up a training set. Additional labeled images may be designated for validation purposes for determining the effectiveness of the convolutional neural network and providing feedback for optimally configuring the network.

The process then continues at block 308, which directs the microprocessor 202 to determine whether further pixels still require processing, in which cause block 310 directs the microprocessor 202 to select the next pixel. In some embodiments, pixels in the image are processed pixelwise by row and column with a stride length of 1 such that the next pixel would be the next pixel in the same row, or at the end of the row would be the first pixel in the next row. In other embodiments, the stride length may be 2 pixels, such that every second pixel in a row and possibly pixels in every second row may be selected for processing. Other stride lengths greater than 2 are also possible, and may be evaluated during training of the convolutional neural network against validation criteria to determine a most effective stride length. The pixelwise processing may thus be on the basis of all pixels in the image or for a subset of pixels in the image. The process 300 then continues at block 306.

If at block 308, it is determined that no further pixels require processing, the microprocessor is directed to block 312. Block 312 directs the microprocessor 202 to perform additional processing on the pixel classification output. The pixel classification output provides a pixelwise classification of the pixels and i.a. establishes a number of pixels as being located on edges of fragmented material portions. Block 312 additionally implements further image processing operations that refine the output of the convolutional neural network to associate groups of pixels on edges as being associated with specific fragmented material portions. For example, various morphological algorithms such as such as dilation, erosion, opening, closing, and or watershed may be applied. Block 312 thus refines the output and produces an identification of the fragmented material portions within the image. The indication may be displayed on the display 260 as a colored map or may be provided in the form of a sieve analysis result, where an estimate of a passing sieve size for fragmented material portions is used to separate the material into a plurality of size bins each corresponding to a sieve mesh size.

In one embodiment pixel data received at block 302 includes a plurality of pixel data sets captured under differing conditions and/or using different image capture parameters. For example, the image sensor 102 may be capable of sensing optical radiation intensity associated with a visible band of wavelengths or thermal radiation intensity associated with infrared wavelengths. In the optical wavelength range the image sensor 102 may capture a full color image defined by several primary colors (for example red, green and blue primary colors). Various other optical wavelength bands may be selectively captured using specially adapted image sensors. Additionally or alternatively, images may be captured by the image sensor 102 under different lighting conditions provided either by natural lighting or illuminated by one or more light sources.

Figure 4:
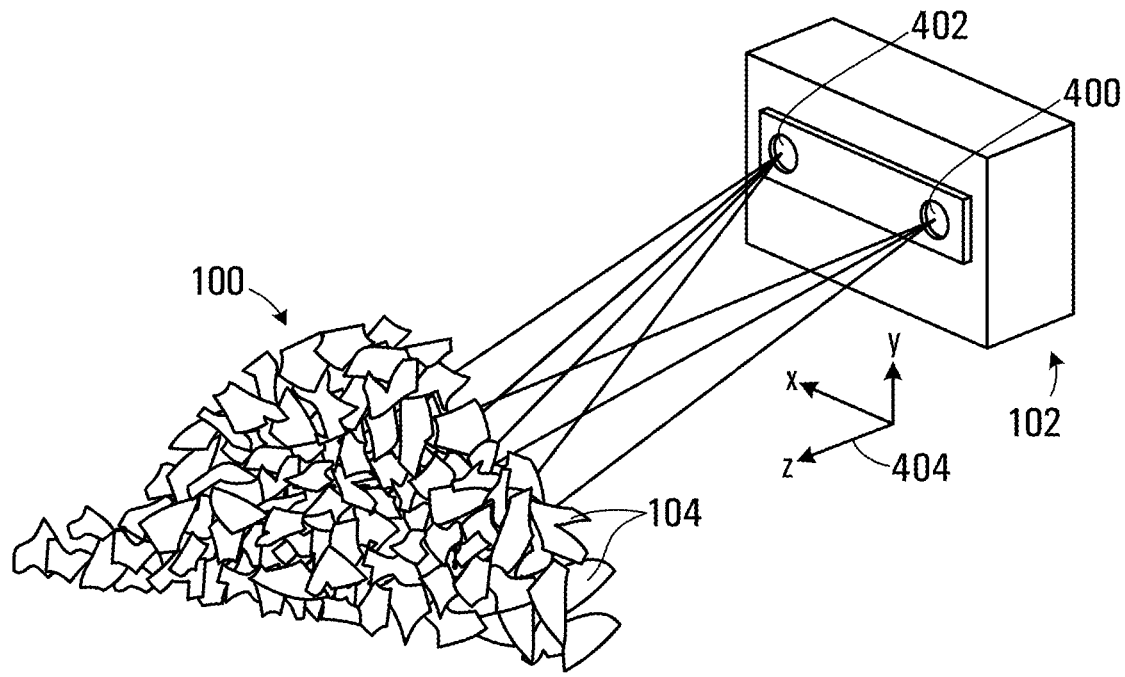
FIG. 4 is a perspective view of an alternative embodiment of an image sensor apparatus for capturing an image of a fragmented material.

In other embodiments the image sensor 102 may include a three dimensional (3D) sensor for receiving a plurality of 3D point locations on surfaces of the fragmented material portions 104 and the pixel data may include depth information. Referring to FIG. 4, in one embodiment the image sensor 102 may include a three dimensional (3D) sensor for receiving a plurality of 3D point locations on surfaces of the fragmented material portions 104 within a coordinate system 404. In the embodiment shown the image sensor 102 includes a pair of sensors 400 and 402 disposed in spaced apart relation to each other along an x-axis that together function as a 3D sensor by providing stereo 2D views of the fragmented material portions 104. The stereo 2D views produced by the respective sensors 400 and 402 may be processed to provide depth information determining disparity between common points in the stereo 2D views of the fragmented material 100. In other embodiments, successive 2D views captured by a single senor from differing perspective points may be used to generate depth information.

One example of a 3D image sensor is the Bumblebee2 Stereo Vision camera manufactured by Point Grey Research Inc. of Richmond, BC, Canada, which has two ⅓ inch CCD image sensors (i.e. the image sensors 400 and 402) that are capable of producing images having 1024×768 pixel resolution.

In other embodiments the image sensor 102 may include a range imaging camera such as a time-of-flight camera that provides 3D point location data. Alternatively a laser ranging device may be used to provide 3D point location data or a structured light illumination pattern may be projected onto the fragmented material 100 and used to determine depth information based on deformation of the structured light.

Figure 5:
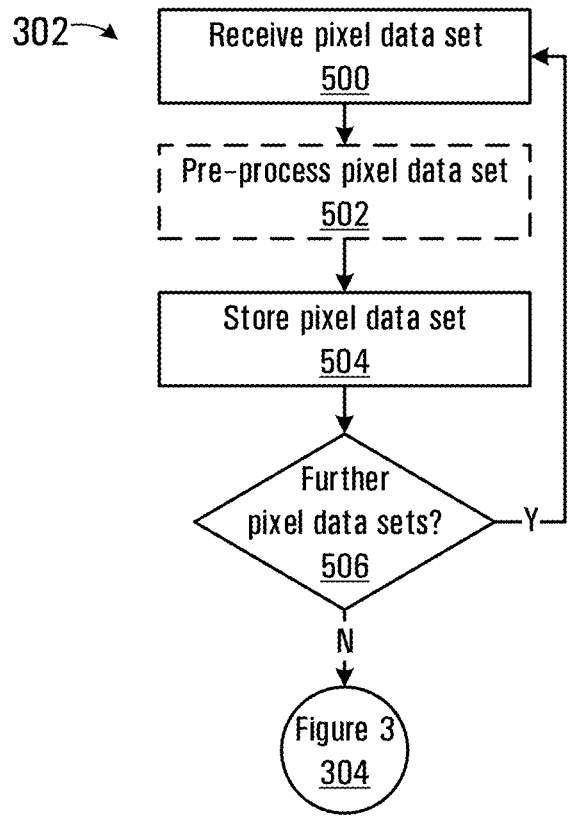
FIG. 5 is a flowchart depicting blocks of code for directing the processor circuit of FIG. 2 to receive pixel data sets from the image sensor shown in FIG. 4.

Block 302 of the process 300 in FIG. 3 is shown in more detail in FIG. 5 for embodiments in which more than one pixel data set is received. The process begins at block 500, which directs the microprocessor 202 to receive the first pixel data set. Block 502 then optionally directs the microprocessor 202 to cause the GPU 210 to pre-process the pixel data set depending on the nature of the pixel data set. For example, where the pixel data set is a depth map obtained using a 3D sensor, the pixel data may be processed using a contrast enhancing algorithm such as a contrast limited adaptive histogram equalization (CLAHE). Various other pre-processing algorithms such as a normalization algorithm may be optionally applied to depth maps or other pixel data sets. In one embodiment a pixel data set may be generated have pixel values that represent a distance between each pixel and a closet edge to the pixel. Pixels that are further from edges of a fragmented material portion have a higher probability of being on the fragmented portion and may provide a useful input for configuring the network.

Block 504 then directs the microprocessor 202 to cause the GPU 210 to store the pixel data set in the pixel memory 212. In the embodiment shown in FIG. 2, the I/O 208 receives the pixel data, which is then optionally pre-processed by the GPU and written directly into the pixel memory 212. Block 506 then directs the microprocessor 202 to determine whether further data sets are still to be received, in which case the microprocessor is directed back to block 500. If at block 506 all the pixel data sets have been received, the process continues at block 304 of the process 300 shown in FIG. 3. In general, the number of pixel data sets may be selected based on their effect on the pixel classification output and the performance of the processor circuit 200 and GPU 210 in processing the pixel data. In one embodiment, pixel data sets for reach primary color red, green, and blue and a depth map have been found to provide a sufficiently sensitive pixel classification output.

Figure 6:
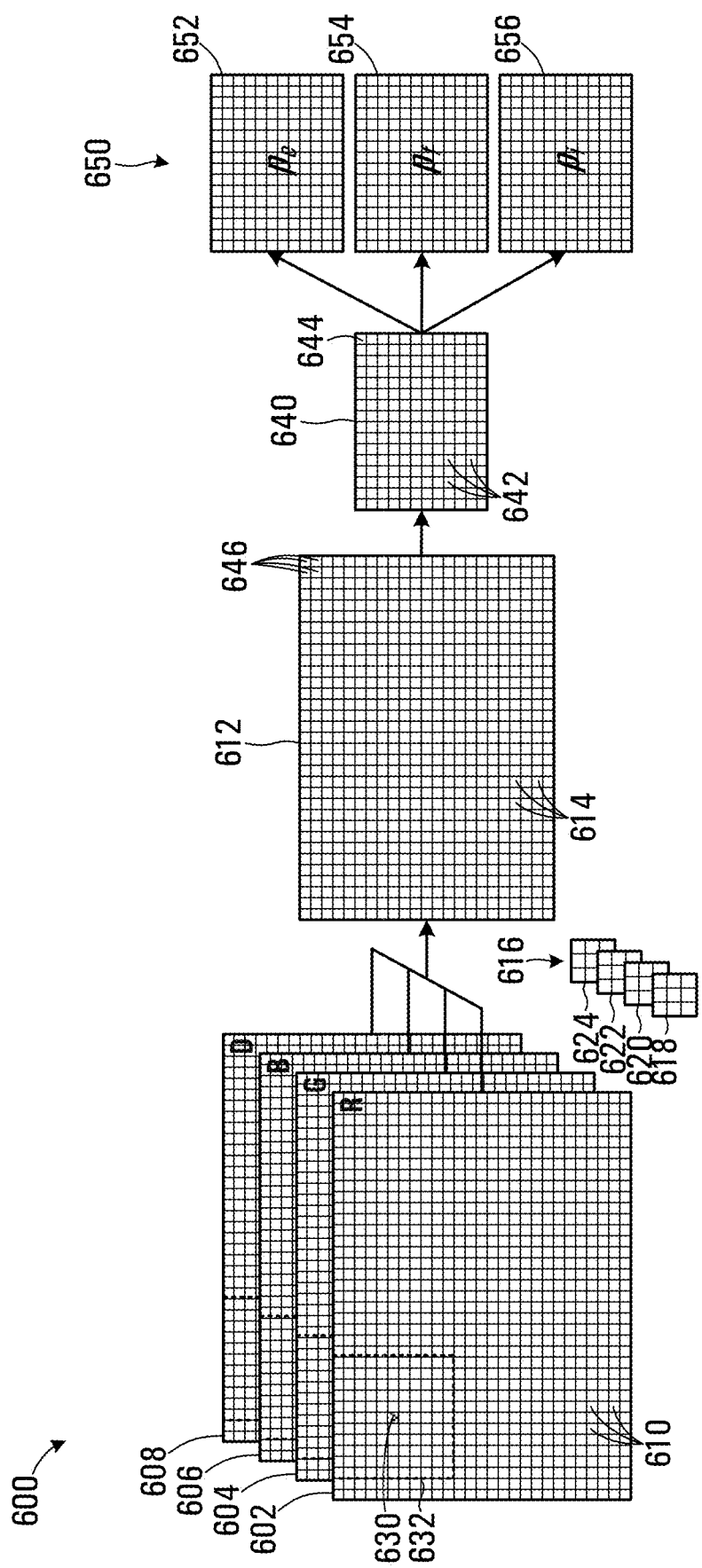
FIG. 6 is a schematic depiction of a neural network implemented on the processor circuit shown in FIG. 2.

The implementation of blocks 304-310 of the process 300 is described further with reference to FIG. 6 in which a neural network is depicted schematically at 600. Referring to FIG. 6, the input pixel data sets are represented by rectangles 602, 604, 606, and 608 each having a plurality of pixels 610. The pixel data sets 602, 604, and 606 are associated with respective primary colors red, green and blue and each pixel has a value representing the intensity at the pixel location for the associated color. The pixel data set 608 is a depth input, where each pixel has a value representing a depth of the pixel with respect to the z-axis shown at 404 in FIG. 1. In other embodiments additional pixel data sets may be included as described above. In neural network terms, each pixel 610 in the input pixel data sets 602-608 thus acts as an input neuron for the neural network 600. In one embodiment depth information is used to determine 3D coordinates on fragmented material portions for determining a physical size of the fragments. The size of the fragments may then be used to produce the sieve analysis result as disclosed above.

The neural network 600 also includes a convolution layer 612 having a plurality of neurons 614. In the embodiment shown, a pixel 630 in each of the input pixel data sets 602-608 is to be classified (i.e. as an edge, inner, or interstitial pixel), and the classification is performed on the basis of a patch of pixels 632. In the embodiment shown, the patch is illustrated as an 11×11 pixel patch, however the patch may be sized in accordance with the sizes of features in the input pixel data. In some embodiments, the patch may be selected and sized in accordance with a scale of fragmented material surrounding a pixel. For example, when performing a fragmentation analysis of a real fragmented material, the patch size 632 may be selected based on user input or pixel depth information. Alternatively, the size of the patch 632 may be based on the pixel classification output using an initial size estimate for the patch 632. In one embodiment the initial size of the patch is selected to be 40×40 pixels, and may be increased up to 80×80 pixels in cases where areas of the image have smooth color probabilities that are representative of larger fragments. The patch size may also be reduced for small fragments (for example to about 20×20 pixels).

In the neural network 600 each neuron 614 in the convolution layer 612 is connected to a subset of the input neurons in the input pixel data sets 602-608 by defining a convolution kernel 616. The convolution kernel 616 in this embodiment has a size of 3×3 pixels and a set of 9 weights 618, 620, 622, and 624 for each pixel input set. The kernel 616 is centered over successive pixels in the patch 632 of the input pixel data sets 602-608 effectively connecting corresponding neurons 614 in the convolution layer 612 to corresponding subsets of the input pixels. For the example of pixel 630 in the input pixel data set 602, the set of weights 618 of the kernel 616 is passed over the patch 632 and the weights are applied to the pixel values to produce the output for a neuron in the convolution layer 612 that corresponds to the input pixel 630. The convolution kernel 616 similarly connects and produces outputs for other corresponding neurons 614 in the convolution layer 612. In this embodiment the convolution kernel 616 applies the same weights to each subset of input pixels and thus will become sensitive to the same features in the input pixels when the weights are subsequently determined during a training of the neural network 600.

In one embodiment pixelwise processing may proceed at a stride of 1 or at a stride greater than 1. In general, the stride may be selected by validating the pixel classification output and selecting a stride based on a tradeoff between processing time and the effectiveness of the fragmentation analysis produced. An advantage of having the same weights for the convolution kernel 616 is that successive patches 632 have a large overlap and convolution results may be saved and re-used for each successive patch, thus significantly reducing the number of computations required. This has the effect of significantly reducing processing time, both in training and subsequently when performing real fragmentation assessments using the trained network 600.

In other embodiments, a sparse kernel may be used to perform the convolution. A sparse kernel is constructed by inserting rows and columns of zero values in the convolution kernel 616. The sparse kernel may have a single row and column of zero values inserted between each element or multiple rows and columns of zero values inserted between elements. The sparse kernel has advantages over processing using a stride length of greater than 1, particularly where the processing is performed by the GPU 210 since operations are still performed on successive adjacent pixels in the input pixel data sets. Processing by a GPU is very effective under such conditions, while processing as a stride greater than 1 requires that input pixels be skipped, which makes much less efficient use of GPU processing capabilities.

Figure 7:
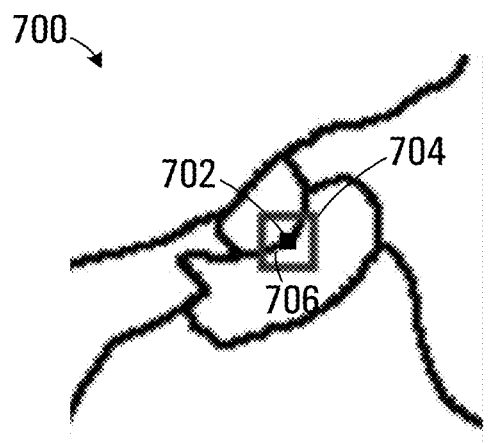
FIG. 7 is a representation of a portion of an image of fragmented material.

A portion of an image of fragmented material is shown in greater detail at 700 in FIG. 7. Referring to FIG. 7, a representation of the convolution kernel is shown as a rectangle 704 centered on a pixel 702. The convolution kernel thus acts as a filter that sets the output of a corresponding neuron in the convolution layer 612 based on the center pixel 702 and the pixels surrounding the center pixel that fall within the kernel. In this case the rectangle 704 covers a portion of a potential edge 706 of a fragmented material portion along with portions surrounding the edge that may be on a fragmented portion or in an interstice between fragmented portions.

Referring back to FIG. 6, the neural network 600 also includes a pooling layer 640, including a plurality of pooling neurons 642. The pooling layer combines outputs of the convolution layer 612 to condense the information to make the neural network 600 less sensitive to input shifts and distortions. In one embodiment a max-pooling process is applied that finds a maximum output value within a group of outputs from the convolution layer 612 and sets the output of a corresponding neuron 642 in the pooling layer 640 to the maximum output value. For example, the output 644 in the pooling layer 640 may be set to the maximum output of the four output neurons 646 in the convolution layer 612. Alternatively, other pooling processes such as average pooling may be implemented where outputs in the convolution layer 612 are averaged to produce the output in the pooling layer 640. In other embodiments, stochastic pooling may be used, where a random output within a group of outputs in the convolution layer 612 is selected to produce the output in the pooling layer 640.

The neural network 600 further includes an output layer 650 that includes a neuron 652 that produces the edge probability $p_e$, a neuron 654 that produces the probability $p_f$ that the pixel is on a fragmented material portion inward from the edge, and a neuron 656 that produces the probability $p_i$ that the pixel is in interstitial space between fragments. In general the interstitial space between fragments include of small fragments that may be difficult to separate as individual fragments limited camera resolution. The neuron 652 includes values for $p_e$ for each pixel output 644 in the pooling layer 640 and thus provides a map representing the probability of each pixel being on an edge. Similarly, the neurons 654 and 656 each produce respective values for $p_f$ and $p_i$ for each pixel output 644 in the pooling layer 640 and thus provide a map of probabilities for fragmented material portions and interstitial spaces. In one embodiment, each of the neurons 652, 654, and 656 may be fully connected to the neurons 642 in the pooling layer 640, which means that the neurons in the output layer 650 each have multiple inputs that are connected to each of the neurons 642.

In one embodiment, a weighting may be applied to the neurons 652, 654, and 656 to produce the outputs for the neural network 600. Different weightings may be assigned to pixels classified as edges of the fragmented material portion, pixels classified as being inward from the edge of a fragmented material portion, and pixels classified as being in an interstice between fragmented material portions. The output would then be $w_e p_e$, $w_f p_f$, and $w_i p_i$, where the weights $w_e$, $w_f$ and $w_i$ may be selected based on the higher probability that for a fragmented material any pixel would be located inward from the edge on a fragmented material portion. This weighting is thus based on the empirical observation that fragmented materials such as rock would generally include a higher proportion of pixels belonging to rocks than edge pixels and/or interstitial pixels.

Figure 10:
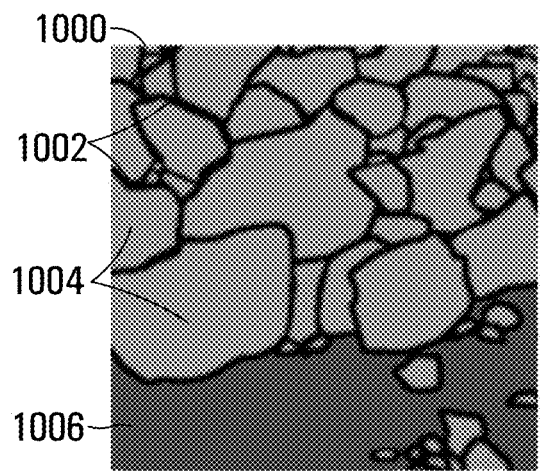
FIG. 10 is a labeled training image used for training the convolutional neural network shown in FIG. 6.

The embodiment of the neural network 600 shown in FIG. 6 is only one example of a network that may be configured to produce the pixel classification outputs at the output layer 650. In general the network 600 is initially configured and then trained using training images that have been examined and labeled. For example, regions of images of fragmented materials may be labeled by an operator to indicate whether the region is a fragmented portion, an edge of a fragmented portion, a void, or a region of fines. The images are then saved along with labeling information as labeled training images. It is desirable to have a sufficient number labeled training images under different lighting and other conditions, differing scale, and differing types of fragmented material. A portion of the labeled training images may be used for training the network and a further portion may be set aside for validation of the neural network 600 to evaluate training effectiveness. An example of a labeled training image is shown in FIG. 10.

During training, the weights for the neural network 600 are initialized to some value and the training images are used to provide the input pixel data sets 602, 604, 606, and 608. The pixel classification output at the output layer 650 is then compared to the labeled training images and a cost function is evaluated expressing the difference between the output layer classification and the labeled classification for a plurality of inputs to the neural network 600. A minimization algorithm, such as a batch gradient descent minimization, is then applied to determine new values for the weights of the convolution kernel 616. This step generally involves determining the gradient of the cost function using a backpropagation algorithm.

Overall effectiveness of the neural network 600 is generally evaluated using the set aside labeled images to evaluate the cost function in a validation process. Adjustments to the neural network 600 may be made in an attempt to improve the effectiveness, such as for example increasing the size of the kernel 616, using additional pixel data sets or reducing the number of pixel data sets etc. Once a desired effectiveness has been reached, the weights are saved for use in performing fragmentation analysis of real fragmented materials. In some embodiments, more than one convolution kernel 616 may be used, thus producing more than one output at the convolution layer 612. The convolution kernels may be different sizes or may have different initially assigned weights during the training exercise.

Figure 8:
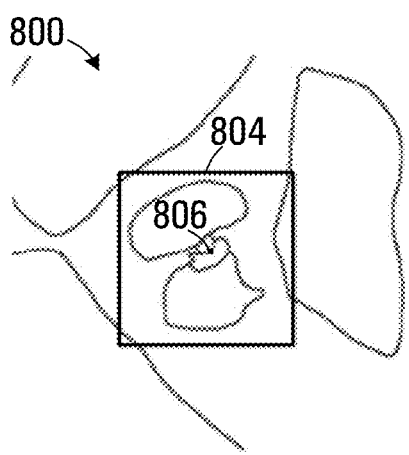
FIG. 8 is a representation of a further portion of an image of fragmented material including the portion shown in FIG. 7.

Referring to FIG. 8 a portion of an image of fragmented material is shown at 800 in FIG. 8 and a representation of an alternative convolution kernel is shown as a rectangle 804 centered on a pixel 802. The image portion 700 in FIG. 7 includes features within the convolution kernel rectangle 804 of the image portion 800 shown on a larger scale. These images illustrate that the identification of fragmented material portions within an image is inherently scale dependent, and the differing scales shown in FIG. 7 and FIG. 8 would likely result in different classifications. For example, the rectangle 704 in FIG. 7 encloses sufficient information to identify that the pixel 702 is likely on an edge of a fragmented material portion. However, the rectangle 804 in FIG. 8 has too much information to determine whether or not an edge is present at the pixel 802. In one embodiment, the training images may be scaled during the training operation to different scales, for example 0.5×, 1×, and 2× thus providing additional training inputs for training the network 600. The neural network 600 thus produces a scaled output at the output layer 650 for each scaled input and corresponding set of training images.

Subsequently, when performing fragmentation analysis of real fragmented materials, a similar scaling may be done thus increasing the number of input pixel data sets shown in FIG. 6. In an alternative embodiment, the pixel classification output layer 650 may be output to a further fully connected layer (not shown) that performs a sizing analysis such as the sieve analysis disclosed earlier herein. A plurality of output neurons, one for each graduation in the sieve analysis, may be connected to the neurons 652, 654, and 656 of the output layer 650. This alternative embodiment of the neural network 600 would be trained using training images that have been labeled in terms of sieve graduations and the network would thus directly produce the sizing analysis result at the additional output layer.

Figure 9:
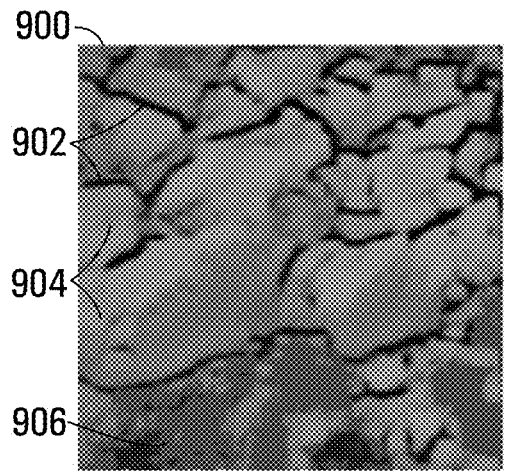
FIG. 9 is an image representation of a pixel classification output.

An example of a pixel classification output representation produced at the output layer 650 is shown in FIG. 9 at 900. An example of a labeled training image used for training the neural network 600 is shown in FIG. 10 at 1000. The output 900 and training image 1000 are shown for a single scaling, but in practice there would be an output 900 for each scaling. Referring to FIG. 10, the training image 1000 has very clearly identified edge pixels 1002 that are shown in dark lines, pixels 904 located inwardly from edges that are shown in light grey, and fines or voids 906 are shown in darker grey. Referring to FIG. 9, the output 900 is shown as an image of the fragmented material 100 in which identified edge pixels 902, pixels 904 located inwardly from edges, and fines or voids 906 are similarly shaded to produce the output representation 900. In the output representation 900, the edge pixels 902 are less clearly defined and do not close to surround fragmented material portions as in the training image 1000. This is due to each pixel in the output representation being shaded based on the output probabilities $p_e$, $p_f$, and $p_i$, such that a pixel having a high probability of being on an edge is shaded darker, while pixels on fragmented portions have a low probability of being edge pixels and are shaded lighter. While the pixel classification produced at the output layer 650 thus provides an initial prediction for fragmentation, actual identification of fragmented material portions is still difficult within the output 900. An output closer to the training image 1000 would be desirable.

Figure 11:
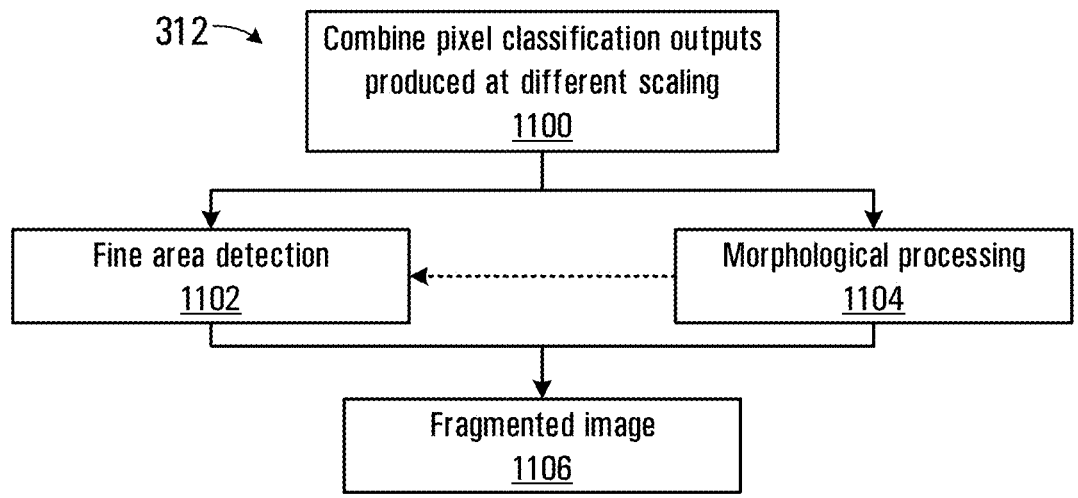
FIG. 11 is a flowchart depicting blocks of code for directing the processor circuit of FIG. 2 to process the pixel classification output.

Referring back to FIG. 3, the output 900 of the pixel classification output layer 650 is further processed at block 312 to associate the identified edge pixels with the fragmented material portions. Block 312 of the process 300 in FIG. 3 is shown in more detail in FIG. 11. Referring to FIG. 11, the process begins at block 1100, which directs the microprocessor 202 to fuse scaled images to produce a composite pixel classification output based on the multiple scaled inputs. Each scaled output yields differing levels of detail and the composite pixel classification output thus includes these different contributions.

Block 1102 directs the microprocessor 202 to cause the GPU 210 to implement image processing functions for identifying regions of finely fragmented material within the composite pixel classification output.

Block 1104 directs the microprocessor 202 to cause morphological processing of the composite pixel classification output. In one embodiment one or more morphological algorithms are applied to the pixel classification output to close edge portions and or determine whether fragmented portions should be separated into multiple fragmented portions. Examples of algorithms that may be employed include a thresholding, adaptive thresholding, watershed and morphological operations such as erosion, dilation, opening, closing, etc.

Watershed algorithms may be useful in closing edges around fragmented portions in the composite pixel classification output, where gradients in the image are examined on the basis of the pixel classification output. Pixels having a higher $p_e$ would correspond to ridges in the watershed while pixels having a low $p_e$ and high $p_f$ would correspond to catchment basin regions. Various watershed algorithm variations are known in the art.

Alternatively or additionally, an erosion algorithm may be used to remove outed pixels from a fragmented material portion having a narrowed section joining to larger sections. Following the erosion, the fragmented portions may separate into two or more fragmented portions if the narrowed section is eliminated by the erosion. The erosion may be followed by a corresponding dilation that would cause the fragmented portions to revert to substantially their original sizes, while the narrowed section would remain eliminated from the image.

In one embodiment the output produced at block 1104 may be used in the fine detection block 1102. The post processing and the morphological operations can help to identify the boundary of a fine region.

The process then continues at block 1106, which directs the microprocessor 202 to combine the fine areas identified at block 1102 and the closed edges identified at block 1104 to produce the fragmented image, in which fragmented material portions are identified.

Figure 12:
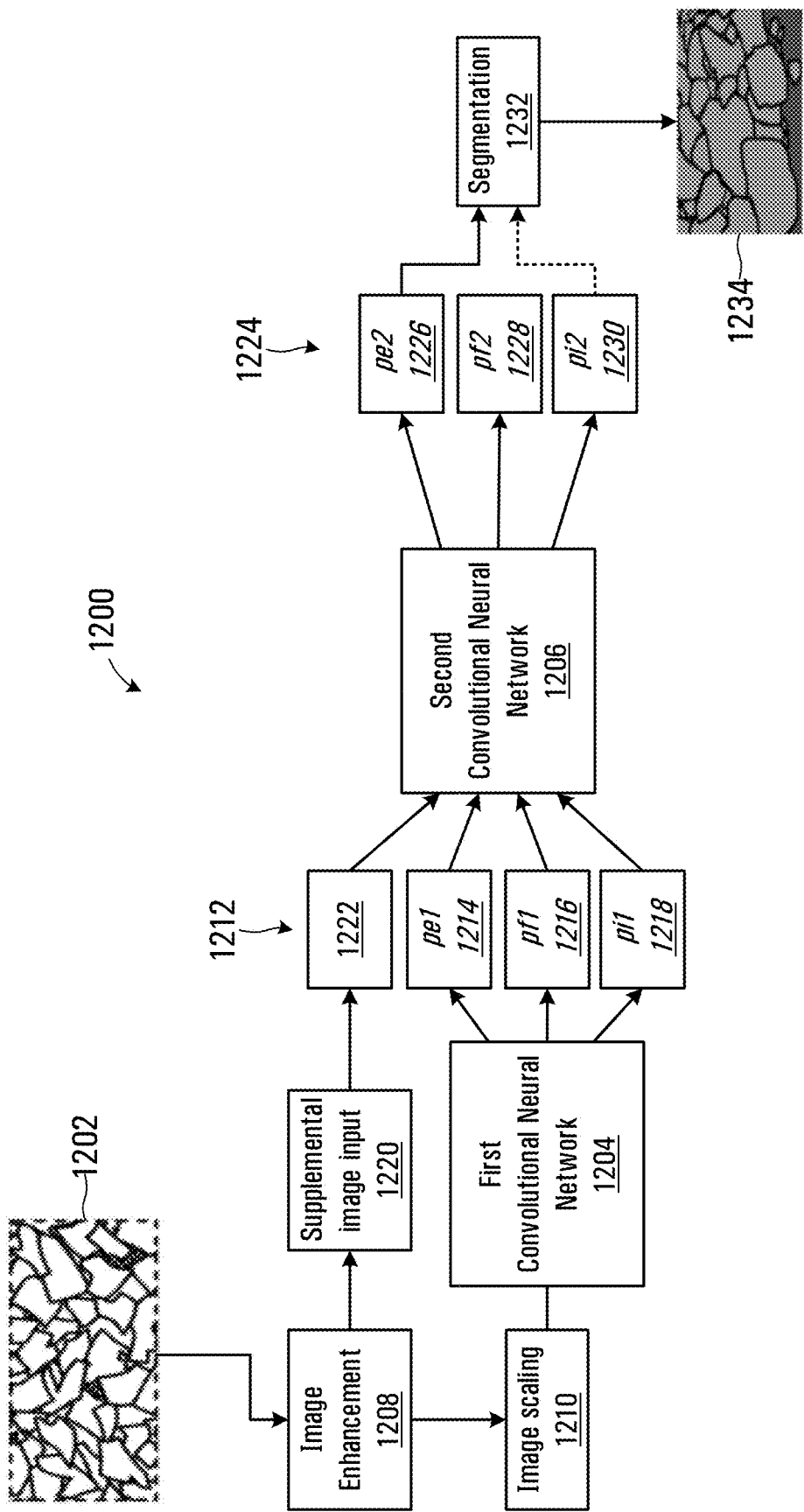
FIG. 12 is a schematic depiction of a neural network embodiment implemented on the processor circuit shown in FIG. 2.

The neural network 600 shown in FIG. 6 represents one example of a convolutional neural network that may be implemented on the processor circuit 200 shown in FIG. 2 to identify fragmented material portions within received pixel data. Referring to FIG. 12, a cascaded convolutional neural network embodiment implemented on the processor circuit 200 of FIG. 2 is shown generally at 1200. The cascaded network 1200 includes a first convolutional neural network 1204 and a second convolutional neural network 1206. A captured image 1202 of the fragmented material 100 within a field of view 114 of the image sensor is received and pre-processed at 1208 using an algorithm such as the contrast limited adaptive histogram equalization (CLAHE) or other algorithm as described above to enhance contrast in the captured image. This is followed by an image scaling at 1210 that may be selected in accordance with the scale of fragmented material within the image to produce a scaled image input. The scaled image input may include several input pixel data sets, including for example optical radiation intensity, thermal radiation intensity, intensities associated with different primary colors, intensities under a plurality of different illumination conditions, intensities for each of a plurality of electromagnetic wavelength ranges, pixel depth information, and a distance between each pixel and a closest edge.

The scaled image input is then provided to the first convolutional neural network 1204, which may operates generally as described above in connection with the neural network 600 producing initial pixel classification outputs 1212. The initial pixel classification outputs 1212 include a probability map 1214 of edge probabilities $p_{e1}$, a probability map 1216 of fragmented material portion probabilities $p_{f1}$, and a probability map 1216 of interstitial space probabilities $p_{i1}$. The outputs $p_{e1}$, $p_{f1}$, and $p_{i1}$ thus generally correspond to the $p_e$, $p_f$, and $p_i$ outputs in FIG. 6.

The outputs $p_{e1}$, $p_{f1}$, and $p_{i1}$ of the first convolutional neural network 1204 are received as inputs at the second convolutional neural network 1206. The enhanced image produced at 1208 is also further processed at 1222 and provided to the second convolutional neural network 1206 as a supplemental image input 1222. In one embodiment, processing at 1220 may involve converting color intensity information for pixels in the captured image 1202 into gray-scale intensity data for producing the supplemental image input 1222.

The second convolutional neural network 1206 may be implemented using a convolution kernel, convolution layer, and one or more pooling layers as generally shown in FIG. 6. The second convolutional neural network 1206 produces pixel classification outputs 1224, which include a probability map 1226 of edge probabilities $p_{ee}$, a probability map 1228 of fragmented material portion probabilities $p_{f2}$ and a probability map 1230 of interstitial space probabilities $p_{i2}$. The pixel classification outputs 1212 are thus used as inputs by the second convolutional neural network 1206 to produce refined pixel classification outputs 1224.

In this embodiment the output probability map 1226 indicating the probability that a corresponding pixel is associated with an edge is provided to a segmentation function, which processes the probability map to produce a segmented output 1234. The segmentation function may be implemented using one of a number of morphological algorithms, such as thresholding, adaptive thresholding, watershed, and morphological operations such as erosion, dilation, opening, closing, etc. In other embodiments the probability map 1230 indicating the probability of pixels being associated with an interstitial space is also optionally fed to the segmentation process 1232, depending on the nature of the segmentation algorithm implemented. As noted above, the probabilities $p_{e2}$, $p_{f2}$, and $p_{i2}$ will together add up to unity for each pixel, and thus the fragmented material portion probability is provided by subtracting the values for $p_{e1}$ and $p_{i1}$ from 1.

In one embodiment, the first and second convolutional neural networks 1204 and 1206 are trained separately. In this case, labeled images are pre-processed at 1208, scaled at 1210 and used to train the first convolutional neural network 1204 to produce desired outputs 1220 and 1214-1218. Once the first convolutional neural network 1204 has been adequately trained, the labeled images are processed through the first network to produce sets of labeled training outputs at 1212. The labeled training outputs at 1212 are then used in a second training exercise to train the second convolutional neural network 1206 to produce desired outputs 1224. In other embodiments the full cascaded neural network 1200 may be trained end to end up to the pixel classification outputs 1224. The segmentation process 1232 is generally non-linear and will be unlikely to contribute to convergence when training the first and second convolutional neural networks 1204 and 1206.

The second convolutional neural network 1206 thus further refines the output of a first convolutional neural network 1204 by combining the probability maps 1214-1218 with one or more supplemental image inputs 1222, such as the a grayscale of the captured image 1202, disparity image including depth information, a superpixel representation of the captured image or other input. The cascading network 1200 uses the first and second trained networks 1204 and 1206 to generate improved probability maps and edge boundaries for a real image input 1202. Each of the first and second networks 1204 and 1206 have a limited capacity during training to learn the complexities of the training images. The first convolutional neural network 1204 is trained to produce a globally optimized solution, while the second convolutional neural network 1206 does a fine tuning of the solution. The cascaded network 1200 thus has the effect of a deeper neural network, but is more simply implemented as two cascaded sub-networks.

Figure 13:
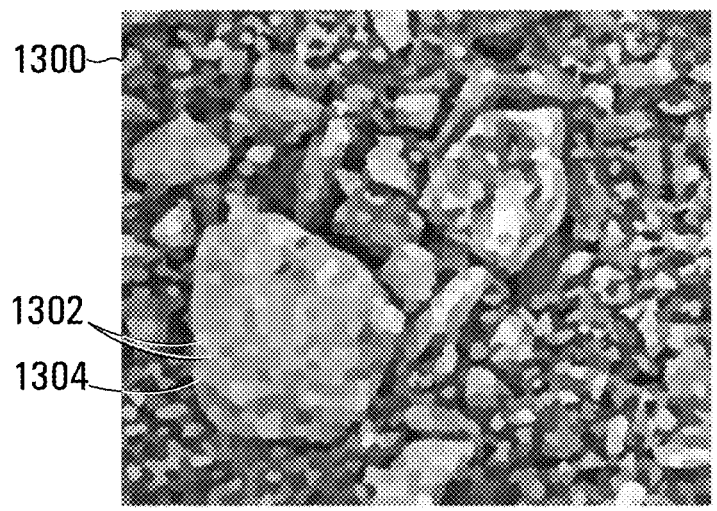
FIG. 13 is an example of a representation of a fragmented material input image that has been processed using a super-pixel algorithm.

In another embodiment the supplementary process at 1220 may involve processing of pixel data to generate a superpixel representation of the enhanced image data. Superpixel algorithms group pixels that have the shape of the pixel grid associated with the captured pixel data sets into regions that have a shape that is more closely based on image features in the captured image. Superpixel processing assigns an average intensity value to a group of neighboring pixels while reducing complexity, which may enhance the capability of the network cascaded network 1200 to learn during training. An example of a representation of a fragmented material input image that has been processed using a superpixel algorithm is shown in FIG. 13 at 1300. The representation 1300 includes a plurality of superpixel regions 1302 each made up of a plurality of image pixels. The superpixels tend to over-segment the image (i.e. each fragmented material portion is represented by a plurality of superpixels). However, advantageously the superpixel processing preserves the edges of the fragmented material portions, allowing each portion to be represented by fewer superpixels in comparison to the original larger number of pixels in the enhanced image. The superpixel representation also has the advantage of significantly reducing the complexity of the image. For example, a 256×256 image size has 65536 gray-scale pixels, while superpixel processing may be implemented that uses ~4000 superpixels to represent the same image. The superpixel representation 1300 thus groups pluralities of pixels to represent fragmented material portions using a reduced number of superpixels with respect to the number of pixels in the pixel data set.

In the embodiment shown in FIG. 12, use of superpixel processing at 1220 provides a less complex input at 1222 to the second convolutional neural network 1206, while still preserving important edge features. The input 1222 is effective in improving performance of the cascaded network 1200 both in training and subsequent operation. The superpixel processing may also be implemented in the neural network 600, shown in FIG. 6.

Alternatively in another embodiment a superpixel representation may be produced for one or more of the output probability maps 1224 and in the segmentation process 1232 merge and split operations may be performed on the superpixel representation. The merge and split operations may be implemented using a classifier that is trained using labeled inputs to determine whether to merge adjacent superpixels. The classifier may be trained on and operate on features from the probability map, as well as other features that can be defined for superpixel pairs, such as: relative size, percentage of shared edge length versus total edge length, etc. The segmentation process 1232 may thus include superpixel processing. Methods for performing superpixel processing are disclosed in "SLIC superpixels. Technical report, École Polytechnique Fédérale de Lausanne, 2010" by R. Achanta, A. Shaji, K. Smith, A. Lucchi, P. Fua, S. Süsstrunk, which is incorporated herein by reference.

Figure 14:
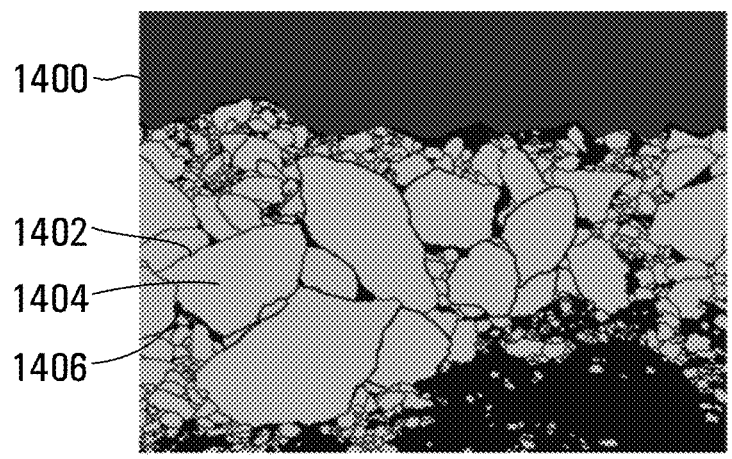
FIG. 14 is a labeled training image used for training the convolutional neural network shown in FIG. 12.
Figure 15:
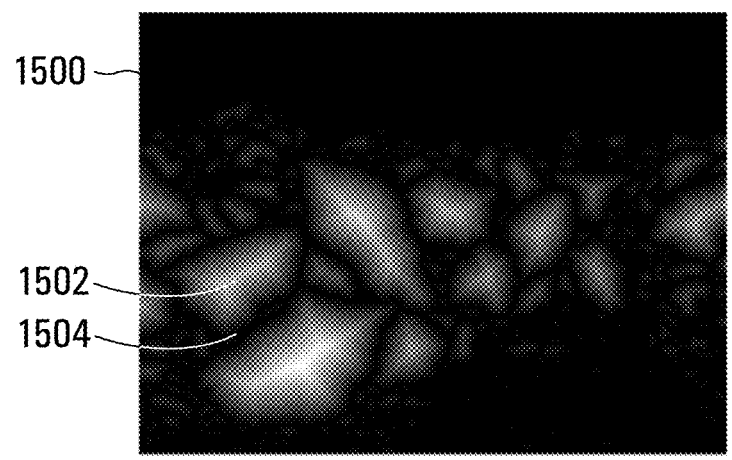
FIG. 15 is a representation of an alternative embodiment of a labeled training image used for training the convolutional neural networks shown in FIG. 6 or 12.

Referring to FIG. 14, an example of a labeled training image is shown at 1400. The training image 1400 has been labeled to identify edges 1402 of fragmented material portions 1404. Portions 1406 lying outside of the labeled edge boundaries correspond to interstitial spaces or fines between fragmented material portions 1404. The labeling of an edge 1402 thus defines the entire enclosed portion as a fragmented material portion (i.e. the light shaded portion). In an alternative embodiment shown in FIG. 15 the training image 1400 is further processed to generate a confidence indication 1500 for identified fragmented material portion within the identified edges 1402. The training image 1500 has a region 1502 close to the center of the fragmented material portion (i.e. the center of portion 1404 in FIG. 14) that is associated with a high confidence of being part of a fragmented material portion, while a region 1504 that is closer to the identified edge (1402 in FIG. 14) is associated with a lower confidence value. The confidence indicator values may thus be set to 1 at the center 1502 and drop to zero proximate the region 1504 based on either a linear or non-linear function such as a sigmoid. The confidence values are thus indicative of a level of labeling confidence associated with the training image 1400.

The alternative training image 1500 may be used as a more effective input for training the neural networks described herein. When using training images such as shown at 1400 in FIG. 14 that have been manually labeled by an operator, uncertainty in the exact placement of an edge may result in training images that are less effective in training the networks. The application of the confidence indicator in the labeled training image 1500 thus provides a more efficient input for training many neural networks.

Referring back to FIG. 6, the pooling process implemented by the pooling layer 640 facilitates a spatially invariant determination by the neural network 600 of whether a feature (such as an edge of a fragmented material portion) is present within a region of the image. In the embodiment shown in FIG. 6, convolution of the input pixel data sets 602 to 608 using the convolution kernel 616 results in a reduced number neurons 614 in the convolution layer 612. The pooling layer 640 further reduces the number of neurons 614 (for example, by a factor of 2 for a 2×2 max-pooling). However, in the process of down-sampling by the pooling layer 640, exact positional information related to the identified feature is lost. If additional convolutional layers and pooling layers were to be included in the neural network 600, the loss of positional information would be even greater.

Figure 16:
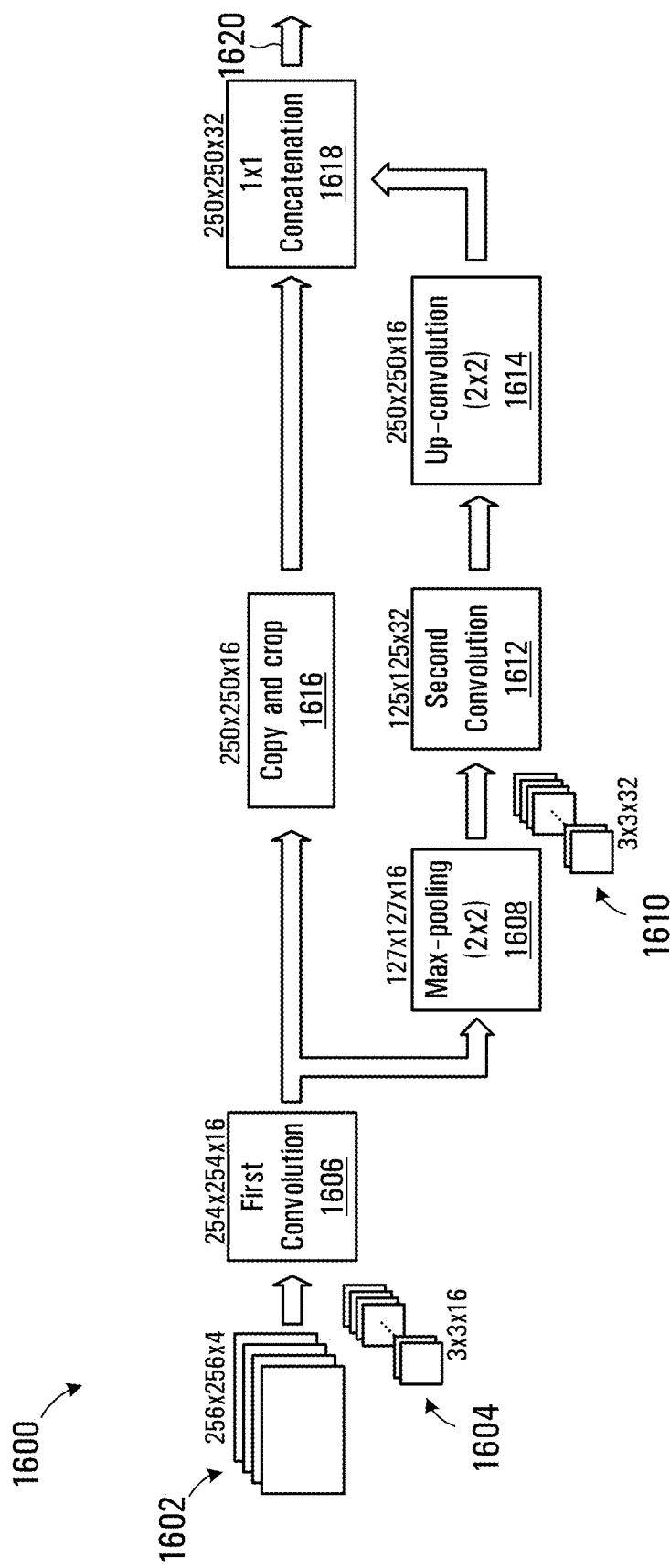
FIG. 16 is a schematic depiction of another neural network embodiment implemented on the processor circuit shown in FIG. 2.

An alternative neural network embodiment that acts to preserve positional information while still efficiently detecting edge features in the input pixel data is shown schematically in FIG. 16 at 1600. The neural network 1600 receives input pixel data sets 1602, which in this example have 256×256 pixels in each of 4 input channels (i.e. Red, Green, Blue and a depth or other input, for example). A convolution kernel 1604 having 16 kernels is used to produce a first convolution 1606 of having 254×254×16 neurons (i.e. 16 channels of 254×254 pixels). The small loss in spatial resolution at the layer 1606 is due to convolutions at the image data boundaries with the 3×3 kernels. A pooling operation such as max pooling produces a pooling layer 1608. The pooling is performed for 2×2 pixel sub-samples and thus reduces spatial content in the layer 1608. In this embodiment a second convolution is performed using a kernel 1610 following the pooling layer 1608, resulting in 125×125×32 neurons in the convolution layer 1612. The spatial content of the information in the convolution layer 1612 is thus more than halved compared to the input pixel data 1602. While the convolution layer 1612 includes information identifying features such as edge features found in the input pixel data 1602, the reduced resolution means that the position of these features within the image are less precisely identified.

In the embodiment shown in FIG. 12, the convolution layer 1612 is followed by a 2×2 up-convolution to produce a 250×250×16 layer 1614. The up-convolution comprises up-sampling and deconvolution processes and results in a 250×250×16 layer 1614. The up-sampling may be performed, for example, by repeating each neuron output in the layer 1612 in successive groups of 2×2 neurons.

A copy of the output of the first convolution layer 1606 is also cropped in a process 1616 to a size of 250×250×16. The cropping permits a 1×1 concatenation of the up-convolution outputs at layer 1614 with the copied and cropped outputs at layer 1616, to produce a concatenated layer 1618 for the neural network 1600. The convolution output 1620 of the layer 1618 may be used to generate the pixel classification outputs 1224 in the cascaded network 1200 of FIG. 12 or the outputs at layer 650 in the FIG. 6 neural network 600. The neural network 1600 thus has two paths. A contracting path (1606-1612) is generally similar to that shown in the convolutional neural network 600 in FIG. 6 where spatial resolution is lost while classifying the pixels. An expansive path 1614 and 1618 implements deconvolution and up-sampling for increasing the resolution of the output. In summary, the pooling and up-sampling processes have an effect on the spatial content, but do not change the number of channels. Convolution processes 1606 and 1612 generally maintain spatial information and produce a number of channels corresponding to the number of kernels in the respective convolution kernels 1604 and 1610. The deconvolution layer 1614 reduces the channel dimension by a factor of 2. The output 1620 thus has only slightly reduced spatial resolution compared to the input pixel data sets 1602.

Figure 17:
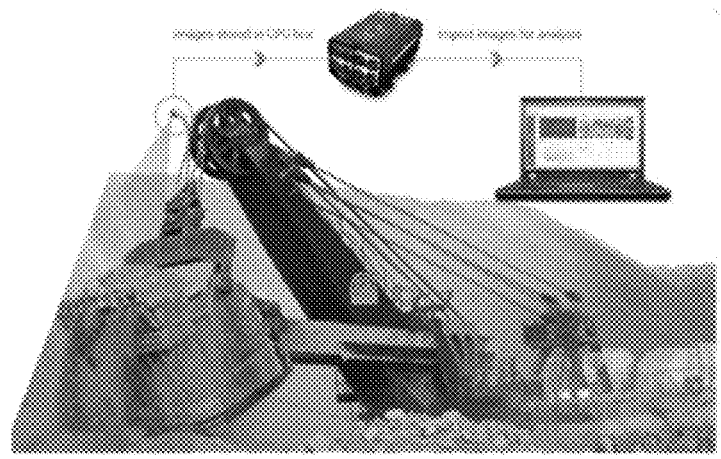
FIG. 17 is photograph of a mining shovel having an image sensor disposed in accordance with one disclosed embodiment.
Figure 18:
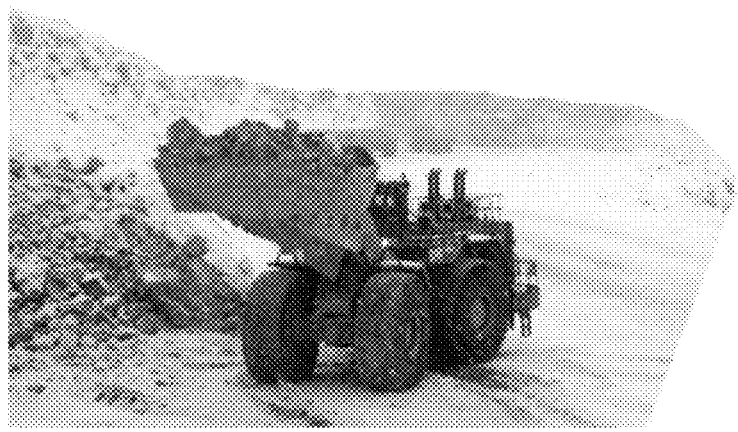
FIG. 18 is photograph of a loader having an image sensor disposed in accordance with another disclosed embodiment.
Figure 19:
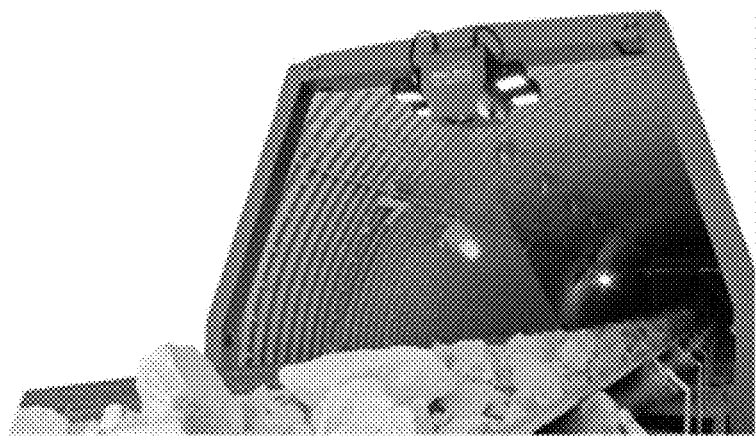
FIG. 19 is photograph of a conveyor belt having an image sensor disposed in accordance with another disclosed embodiment.

The image sensor 102 and processor circuit 200, when configured to implement the neural network 600 may be used to perform a fragmentation analysis of materials for many different purposes. For example the image sensor 102 shown in FIG. 1 may be disposed on a portable fragmentation analyzer that includes the processor circuit 200 and displays fragmentation analysis results on the display for performing assessments in the field. Alternatively, the image sensor 102 may be in communication with a remotely located processor circuit that is operable to produce results for a fragmentation analysis of submitted image data. In other embodiments, the image sensor 102 may be disposed to capture an image of fragmented material being conveyed by a ground engaging tool of heavy equipment, such as a bucket of a mining shovel or loader. An example of a mining shovel having an image sensor disposed above the loading bucket is shown in FIG. 17. In FIG. 18 an image sensor disposed below a loading bucket of a loader and is able to capture images of fragmented material in the bucket when the material is in view of the image sensor. Alternatively, the image sensor 102 may be disposed to capture images of fragmented material in a load-carrying container of a haul truck or on a conveyor belt, such as shown in FIG. 19.

While specific embodiments have been described and illustrated, such embodiments should be considered illustrative of the invention only and not as limiting the invention as construed in accordance with the accompanying claims.

What is claimed is:

1. A method for processing an image of fragmented material to identify fragmented material portions within the image, the method comprising:
receiving pixel data associated with an input plurality of pixels representing the image of the fragmented material;
processing the pixel data using a convolutional neural network, the convolutional neural network having a plurality of layers and producing a pixel classification output, the pixel classification output indicating:
a probability $p_e$ that the pixel is located at an edge of a fragmented material portion;
a probability $p_f$ that the pixel is located inward from the edge of a fragmented material portion; and
a probability $p_i$ that the pixel is located at an interstice between fragmented material portions;
wherein the convolutional neural network includes at least one convolution layer configured to produce a convolution of the input plurality of pixels, the convolutional neural network having been previously trained to produce the pixel classification using a plurality of training images including previously identified fragmented material portions classified in accordance with the pixel classification; and
performing a segmentation of the image by applying a morphological algorithm to the pixel classification output to close edge portions surrounding fragmented material portions to identify the fragmented material portions within the image, the edge portions being associated with pixels having higher probability $p_e$ and lower probability $p_f$.

2. The method of claim 1 wherein producing the convolution comprises producing the convolution using a sparse kernel having entries separated by rows and columns of zero values.

3. The method of claim 2 wherein producing the convolution comprises producing the convolution using a sparse kernel having entries separated by a plurality of rows and a plurality of columns of zero values.

4. The method of claim 1 wherein processing the pixel data using the convolutional neural network comprises processing the pixel data using a first convolutional neural network and using the pixel classification output as an input for a second convolutional neural network operable to produce a refined pixel classification output.

5. The method of claim 1 wherein the plurality of training images include previously identified fragmented material portions, each fragmented material portion enclosed by an edge and wherein regions of the fragmented material portion closer to the edge are assigned lower confidence values than regions of the fragmented material portion away from the edge, the confidence values being indicative of a level confidence associated with the previously identified fragmented material portions in the training image.

6. The method of claim 1 wherein receiving the pixel data comprises receiving a plurality of pixel data sets, each pixel data set including data associated with at least one of:
   an optical radiation intensity;
   a thermal radiation intensity;
   intensities associated with different primary colors;
   intensities under a plurality of different illumination conditions;
   intensities for each of a plurality of electromagnetic wavelength ranges;
   pixel depth information; and
   a distance between each pixel and a closest edge.

7. The method of claim 6 further comprising processing at least one of the plurality of pixel data sets to produce a superpixel representation of the pixel data set, the superpixel representation grouping pluralities of pixels to represent the fragmented material portions using a reduced number of superpixels with respect to the number of pixels in the pixel data set.

8. The method of claim 1 wherein producing the convolution comprises producing a plurality of convolutions of the input plurality of pixels.

9. The method of claim 1 further comprising generating pixel depth information by at least one of:
   determining a pixel disparity associated with images produced by a stereoscopic image sensor;
   determining a pixel disparity associated with successive images produced by an image sensor;
   receiving time-of-flight data for pixels in the input plurality of pixels;
   determining depth information based on a deformation of a structured light pattern projected onto the fragmented material; and
   receiving a 3D point cloud produced by a laser sensor and processing the point cloud to determine a depth associated with pixels in the input plurality of pixels.

10. The method of claim 9 further comprising pre-processing the pixel depth information prior to producing the convolution.

11. The method of claim 9 further comprising using the pixel depth information to estimate a physical size of the fragmented material portions.

12. The method of claim 11 further comprising determining a size distribution based on the estimated physical size of the fragmented material portions.

13. The method of claim 12 further comprising converting the determined size distribution into a corresponding sieve analysis result.

14. The method of claim 1 wherein processing the pixel data using the convolutional neural network further comprises processing the pixel classification output in a further neural network layer to generate a size distribution output, the neural network having been previously trained using a plurality of fragmented material training images including fragment size indications for the fragmented material portions.

15. The method of claim 1 wherein the convolutional neural network comprises a pooling layer configured to process the convolution to provide a plurality of pooling outputs, each pooling output being based on values associated with a plurality of pixels in the convolution.

16. The method of claim 15 wherein the pooling layer implements one of a max-pooling, an average pooling, and a stochastic pooling process.

17. The method of claim 15 wherein the convolutional neural network comprises at least one up-sampling layer following the pooling layer the up-sampling layer being operable to replicate outputs to produce an up-sampled pixel classification, and further comprising:
   generating a cropped copy of the convolution of the input plurality of pixels, the cropped copy having a size corresponding to the size of the up-sampled pixel classification; and
   combining the up-sampled pixel classification with the cropped copy of the convolution to produce a pixel classification having increased spatial resolution.

18. The method of claim 1 further comprising applying a weighting to the pixel classification output, the weighting having different weights assigned to pixels classified as edges of the fragmented material portion, pixels classified as being inward from the edge of a fragmented material portion, and pixels classified as being in an interstice between fragmented material portions.

19. The method of claim 1 wherein applying the morphological algorithm to the pixel classification output comprises implementing at least one of:
   a dilation algorithm;
   an erosion algorithm, a watershed algorithm;
   an opening algorithm; and
   a closing algorithm.

20. The method of claim 1 further comprising identifying interstices between fragmented material portions as including one of fine fragmented material and a void.

21. The method of claim 1 further comprising resampling the pixel data associated with the input plurality of pixels to produce at least one resampled input plurality of pixels and wherein processing using the convolutional neural network comprises processing the one or more resampled input plurality of pixels, the convolutional neural network having been previously trained using a correspondingly resampled plurality of fragmented material training images including previously identified fragmented material portions.

22. The method of claim 21 wherein resampling the pixel data comprises at least one of up-sampling the pixel data and down-sampling the pixel data.

23. The method of claim 1 wherein the pixel classification output is generated by performing the convolution on patches of pixels surrounding a pixel being classified, the patch of pixels having a size selected in accordance with a scale of fragmented material surrounding the pixel being classified, the scale being determined by one of:
   a user input,
   pixel depth information;
   based on a trained network from corresponding pixel and depth data; and
   based on pixel classification output using an initial selection of patch size.

24. An apparatus for performing a fragmentation analysis, the apparatus comprising:
   an image sensor operable to capture an image of fragmented material including fragmented material portions and to generate pixel data associated with an input plurality of pixels representing the image;
   a processor circuit operably configured to process the pixel data using a convolutional neural network, the convolutional neural network having a plurality of layers and producing a pixel classification output, the pixel classification output indicating:

a probability $p_e$ that the pixel is located at an edge of a fragmented material portion;

a probability $p_f$ that the pixel is located inward from the edge of a fragmented material portion; and a probability $p_i$ that the pixel is located at an interstice between fragmented material portions;

wherein the convolutional neural network includes at least one convolution layer configured to produce a convolution of the input plurality of pixels, the convolutional neural network having been previously trained using a plurality of training images including previously identified fragmented material portions classified in accordance with the pixel classification; and the processor circuit being further operably configured to perform a segmentation of the image by applying a morphological algorithm to the pixel classification output to close edge portions surrounding fragmented material portions to identify the fragmented material portions within the image, the edge portions being associated with pixels having higher probability $p_e$ and lower probability $p_f$.

25. The apparatus of claim 24 wherein the processor circuit comprises a graphics processing unit (GPU) and associated graphics memory and wherein the convolutional neural network is implemented at least in part using GPU functions and wherein data generated by operations associated with the convolutional neural network is stored in the graphics memory.

26. The apparatus of claim 24 wherein the image sensor is disposed on one of:

a portable fragmentation analyzer including a processor circuit operable to produce results of the fragmentation analysis; and a fragmentation imager in communication with a remotely located processor circuit operable to produce results of the fragmentation analysis.

27. The apparatus of claim 24 wherein the image sensor is disposed to capture an image of fragmented material being conveyed by one of:

a ground engaging tool of heavy equipment operable to load fragmented material;

a load-carrying container of a haul truck; and a conveyor belt.

28. A method for processing an image of fragmented material to identify fragmented material portions within the image, the method comprising:

receiving pixel data associated with an input plurality of pixels representing the image of the fragmented material;

processing the pixel data using a convolutional neural network, the convolutional neural network having a plurality of layers and producing a pixel classification output, the pixel classification indicating whether pixels in the input plurality of pixels are located at:

an edge of a fragmented material portion;

inward from the edge of a fragmented material portion; or an interstice between fragmented material portions;

wherein the convolutional neural network includes at least one convolution layer configured to produce a convolution of the input plurality of pixels, the convolutional neural network having been previously trained to produce the pixel classification using a plurality of training images including previously identified fragmented material portions classified in accordance with the pixel classification; and processing the pixel classification output to associate identified edges with fragmented material portions wherein the convolutional neural network comprises a pooling layer configured to process the convolution to provide a plurality of pooling outputs, each pooling output being based on values associated with a plurality of pixels in the convolution; and wherein the convolutional neural network comprises at least one up-sampling layer following the pooling layer the up-sampling layer being operable to replicate outputs to produce an up-sampled pixel classification, and further comprising:

generating a cropped copy of the convolution of the input plurality of pixels, the cropped copy having a size corresponding to the size of the up-sampled pixel classification; and combining the up-sampled pixel classification with the cropped copy of the convolution to produce a pixel classification having increased spatial resolution.

* * * * *